(12) United States Patent
Neauport et al.

(10) Patent No.: US 9,013,794 B2
(45) Date of Patent: Apr. 21, 2015

(54) DISPERSIVE OPTICAL DEVICE WITH THREE-DIMENSIONAL PHOTONIC CRYSTAL

(75) Inventors: Jerome Neauport, Bordeaux (FR); Nicolas Bonod, La Londe les Maures (FR)

(73) Assignees: Commissariat a l'Energie Atomique, Paris (FR); Centre National de la Recherche Scientifique, Paris (FR)

( * ) Notice: Subject to any disclaimer, the term of this patent is extended or adjusted under 35 U.S.C. 154(b) by 599 days.

(21) Appl. No.: 12/678,176

(22) PCT Filed: Sep. 23, 2008

(86) PCT No.: PCT/EP2008/062708
§ 371 (c)(1),
(2), (4) Date: Mar. 15, 2010

(87) PCT Pub. No.: WO2009/040353
PCT Pub. Date: Apr. 2, 2009

(65) Prior Publication Data
US 2010/0202057 A1    Aug. 12, 2010

(30) Foreign Application Priority Data
Sep. 25, 2007  (FR) ...................... 07 57815

(51) Int. Cl.
*G02B 5/18* (2006.01)
*G02B 6/122* (2006.01)
*B82Y 20/00* (2011.01)

(52) U.S. Cl.
CPC ............... *G02B 6/1225* (2013.01); *B82Y 20/00* (2013.01); *G02B 5/18* (2013.01)

(58) Field of Classification Search
USPC ......... 359/372, 558, 566, 569, 570, 571, 574, 359/575, 576, 337.2, 337.21, 349, 838, 839, 359/884, 577, 580, 584, 586, 588, 589, 359/590; 398/79, 82, 81, 84, 147, 158, 192; 372/9, 20, 21, 25, 26, 28, 92, 98, 102
See application file for complete search history.

(56) References Cited

U.S. PATENT DOCUMENTS 5,166,818 A     11/1992   Chase et al.
5,639,517 A      6/1997   Floch et al.
(Continued)

FOREIGN PATENT DOCUMENTS

EP      1 780 563 A1    5/2007
FR      2 693 558 A1    1/1994
(Continued)

OTHER PUBLICATIONS

J. D. Joannopoulos, S. G. Johnson, J. N. Winn, R. D. Meade, "Photonic Crystals: Molding the flow of light", 2nd Edition, Princeton University Press, Princeton, New Jersey, 2008. Obtainable at http://ab-initio.mit.edu/book/photonic-crystals-book.pdf.*

(Continued)

*Primary Examiner* — Arnel C Lavarias
(74) *Attorney, Agent, or Firm* — Pearne & Gordon LLP (57) ABSTRACT

A dispersive optical device with a three-dimensional photonic crystal. The object is to obtain a device having a high damage threshold on the whole and the making of which is facilitated and guaranteeing optimum optical properties. This object is achieved by using a device in silica including a three-dimensional photonic crystal and a diffraction grating. This device may notably be used in a compressor system for a short pulse.

9 Claims, 4 Drawing Sheets

(56) References Cited

U.S. PATENT DOCUMENTS

| | | | |
|---|---|---|---|
| 5,907,436 A * | 5/1999 | Perry et al. | 359/576 |
| 6,517,763 B1 * | 2/2003 | Zakhidov et al. | 264/344 |
| 6,858,079 B2 | 2/2005 | Norris et al. | |
| 7,302,147 B2 | 11/2007 | Takagi et al. | |
| 2005/0270633 A1 * | 12/2005 | Herman et al. | 359/321 |
| 2006/0262385 A1 | 11/2006 | Takagi et al. | |
| 2009/0028206 A1 | 1/2009 | Borneis et al. | |
| 2011/0203663 A1 * | 8/2011 | Prather et al. | 136/259 |

FOREIGN PATENT DOCUMENTS

| | | |
|---|---|---|
| WO | 92/15903 A1 | 9/1992 |
| WO | 2006/089681 A2 | 8/2006 |

OTHER PUBLICATIONS

Perry et al; "High-efficiency multilayer dielectric diffraction gratings", Optics Letters vol. 20, No. 8 Apr. 15, 1995 pp. 940-942.

Vlasov et al; On-chip natural assembly of silicon photonic bandgap crystals Nature, vol. 414. Nov. 15, 2001, pp. 289-293. www.nature.com.

International Search Report for PCT/EP2008/062708 dated Jan. 12, 2009.

French Search Report for FR 0757815 dated May 30, 2008.

* cited by examiner

Fig.1

Prior Art

DISPERSIVE OPTICAL DEVICE WITH THREE-DIMENSIONAL PHOTONIC CRYSTAL

TECHNICAL FIELD

The present invention relates to a dispersive optical device notably comprising a reflection diffraction grating, in particular used for compressing laser beam pulses.

STATE OF THE PRIOR ART

Diffraction gratings have experienced great development for about twenty years, notably in connection with short pulse lasers, i.e. lasers for which the pulse has a duration of the order of picoseconds to femtoseconds. The PetaWatt laser, for example, delivers a pulse of few kilojoules in a few picoseconds, and thus has a power of the order of $10^{15}$ Watt.

Obtaining this type of pulse has a certain number of difficulties. It is notably not possible to directly amplify a pulse without generating non-linear effects which deteriorate the time and space characteristics of the beam and may damage the amplifying materials. This drawback may be avoided with the so-called frequency shift amplification method.

The frequency shift amplification method in a first phase consists of time-stretching the pulse so that the duration of the pulse is increased and its power reduced. The pulse is then amplified by propagation in an adequate material, such as for example a sapphire crystal doped with titanium ($Ti^{3+}:Al_2O_3$). Finally, the pulse is time-compressed so as to recover its initial duration. The stretching and compressing systems used are usually reflection diffraction gratings.

The diffraction grating is an optical device having a periodical arrangement of patterns on a surface. In order that diffraction occurs, the wavelength of the incident beam should be of the same order of magnitude as the distance between two rulings, called the pitch of the grating. The angle of the diffracted beam $r_m$ in the diffraction order m is calculated from the angle of the incident beam i, from the wavelength of the beam $\lambda$, and from the pitch of the grating a. The angles of the incident and diffracted beams are measured relatively to the normal n to the surface of the diffraction grating. The diffraction law for gratings is expressed by:

$$\sin r_m = \sin i + m\lambda/a.$$

Figure 1:
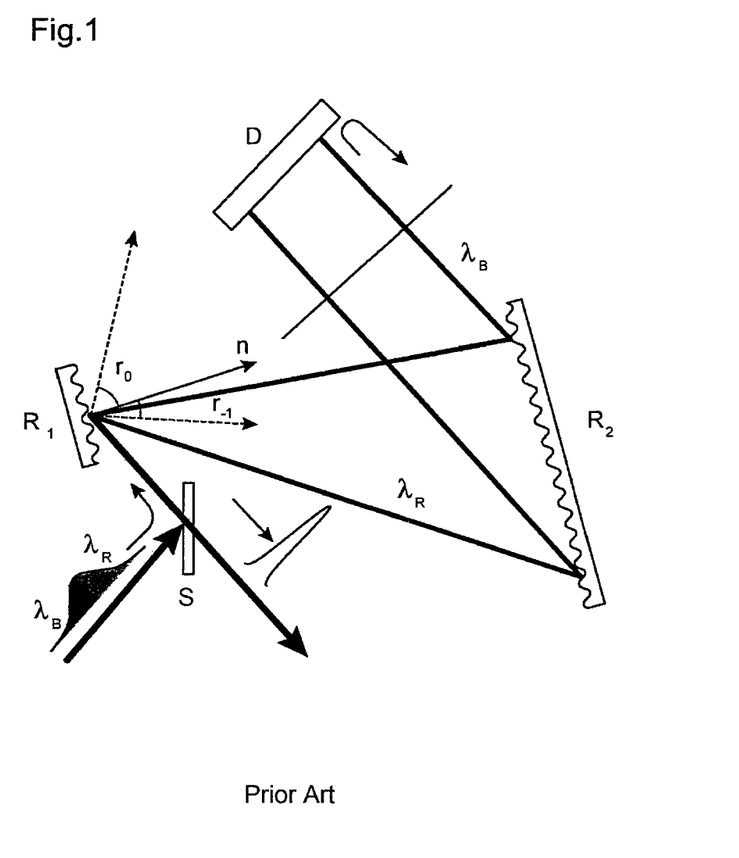
FIG. 1 shows a diagram of a compressor system known from the state of the art.

The principle of a stretching or compressing system is based on the path-length difference in the optical paths. FIG. 1 shows the diagram of a compressor system. The optical signal in a first phase is reflected by a semi-reflective plate S and then diffracted by a grating with negative dispersion $R_1$. The angular dispersion $D_a$ of a grating defines the dependence of the reflection angle $r_m$ on the wavelength $\lambda$ and is expressed by the relationship:

$$D_a = \frac{dr_m}{d\lambda} = \frac{m}{a\cos r_m}$$

An optical system with negative dispersion imposes that high frequencies of the signal, as this is shown in FIG. 1, cover a shorter optical path than the low frequencies. The different monochromatic beams obtained with the first grating are again reflected by a second grating $R_2$ and then by a dihedron D before covering the reverse optical path. Thus, long wavelengths $\lambda_R$ have covered a longer optical path than short wavelengths $\lambda_B$. Also, the outgoing pulse has a shorter duration. The compressor system is arranged so that the beam recovers the initial duration which it had at the input of the stretcher system.

The reflection of an incident beam of short pulses should occur without damaging the materials and while retaining the time and space characteristics of the signal. The reflection of the beam may be obtained by different means. Application of a metal layer such as aluminium, silver or gold, is often used but remains limited to low energy pulses. Indeed, the metal has a non-negligible absorption rate. The absorbed energy is then dissipated as heat and may seriously damage the materials. Reflection may also be obtained by total internal reflection. The latter imposes that the beam beyond a certain incident angle is totally reflected. However this requires that the beam stems from the most refractive material, which therefore cannot be air. The beam in this case should arrive through a solid material. Now, during the propagation in the material, the beam undergoes non-linear effects which degrade the space and time characteristics of the pulse in an unacceptable way in the short-pulse regime. It is therefore necessary that the beam propagates in air or in vacuo towards the reflective medium of higher refractive index. The reflective media customarily used are dielectrics since they have the advantage of having a higher damage threshold than that of metals. As an example, the article of Perry et al. entitled <<High-efficiency multilayer dielectric diffraction gratings>> and published in 1995 in Optics Letters, Vol. 20 No. 8 indicates that a gold (Au) layer on a grating has an experimental damage threshold of 1 $J/cm^2$ for a pulse of wavelength 1053 nm with a duration of the order of one nanosecond and 0.4 $J/cm^2$ for a pulse with a duration of less than one picosecond. For a beam of the same wavelength, a silica glass dielectric material has a damage threshold respectively greater than 20 $J/cm^2$ in the nanosecond range and 2 $J/cm^2$ in the sub-picosecond range.

The total number of propagative diffracted orders is determined by the pitch of the grating a, for set wavelength and angle of incidence. Order 0 corresponds to the non-dispersive specular component. Order −1 is the sought dispersive order. The number of propagative orders is therefore limited to 2 and the whole of the incident energy may be collected in the dispersive order −1.

Figure 2:
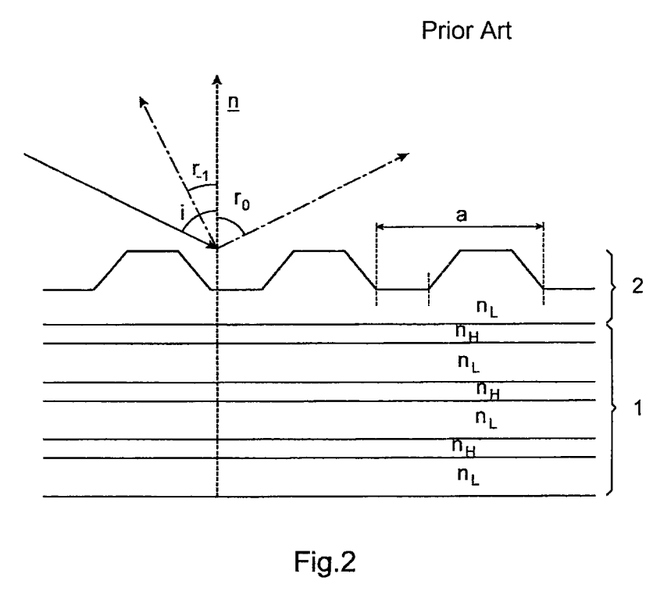
FIG. 2 describes an exemplary diffraction grating arranged on a multilayer dielectric medium according to the state of the art.

An optical device is known, comprising a diffraction grating engraved on a dielectric mirror and deposited on a substrate, as disclosed by U.S. Pat. No. 5,907,436. The dielectric mirror is a multilayer structure corresponding to the stacking of two dielectric materials with low $n_L$ and high $n_H$ refractive indexes, as shown in FIG. 2. For example, these materials may respectively be $SiO_2$ and $HfO_2$, or further $SiO_2$ and $Ta_2O_5$. The optical thicknesses of the different layers should be either equal to a quarter wavelength, or optimized so as to guarantee maximum reflectivity of the mirror at the wavelength of the pulse. In TE polarization, about twenty layers is thus generally required for obtaining a reflection close to 100%. Finally the diffraction grating is engraved in a thin dielectric layer. This optical device has a diffraction efficiency in reflection of the order of 98% in the order −1, as well as a higher damage threshold than that of metals, as shown by the article of Perry et al. mentioned above.

A dielectric mirror is a particular case of a photonic crystal. Photonic crystals are materials having frequency bands for which a beam of the same frequency cannot propagate. Thus, regardless of the angle of the incident beam, the beam is reflected. Maximum reflectivity may be obtained with these photonic forbidden bands.

However, a certain number of difficulties appear upon using this type of optical device. On the one hand, a multilayer dielectric requires the use of two materials with different mechanical properties and a large number of layers required for the quality of the reflection. The making of the stack of layers is delicate since any thickness fault of the different layers has to be avoided, a fault which reduces the reflective efficiency of the dielectric mirror. Indeed, the interfaces between both materials undergo mechanical stresses, because of the differences in physical and mechanical properties which make them brittle. These stresses lead to the deformation of the surface of the diffraction grating, which causes a degradation of the space profile of the pulse. The interfaces promote the formation of local faults in which the magnetic field is strongly reinforced, which is potential source of damage.

Further, considering the power of the beam to be diffracted, it is essential to guarantee a high damage threshold of the materials.

Finally, it is important to provide a method for making the optical device, which is easy while guaranteeing optimum optical properties.

DISCUSSION OF THE INVENTION

The present invention is defined by an optical device, notably for laser pulse compression, comprising a reflection diffraction grating in a dielectric material directly arranged on a reflective structure, said reflective structure being a three-dimensional photonic crystal of the same dielectric material as said diffraction grating.

Advantageously, said reflective structure is an arrangement of the face-centered cubic lattice or hexagonal lattice type.

In a first embodiment, said reflective structure is a periodic three-dimensional arrangement of spheres.

In a second embodiment, said reflective structure is a matrix containing a periodic three-dimensional arrangement of spherical holes.

Advantageously, said diffraction grating and said reflecting structure are in silica.

Alternatively, said diffraction grating and said reflective structure are in silicon.

SHORT DESCRIPTION OF THE DRAWINGS

Other features and advantages of the invention will become apparent upon examining the appended figures wherein.

DETAILED DISCUSSION OF PARTICULAR EMBODIMENTS

The principle of the invention is based on the use of a diffraction grating in dielectric material deposited on a reflective medium consisting of a three-dimensional photonic crystal of the same dielectric material as the diffraction grating.

According to the present invention, by using a reflecting medium made of a single dielectric material, it is possible to get rid of the problems of mechanical stresses localized at the interfaces of different materials.

According to the present invention, by using a same dielectric material, both the diffraction grating and for the photonic crystal, it is possible to obtain a high overall damage threshold of the device since it consists of a single material. There is no other material used which would reduce the overall damage threshold of the optical device.

According to the present invention, by using a three-dimensional photonic crystal, it is possible to get rid of the limitations inherent to two-dimensional photonic crystals relating to the making of the optical device while having optimum optical properties of the crystal. Indeed, a two-dimensional crystal, such as for example a stack of cylinders, has a preferential direction corresponding to the axis of the cylinders. This axis, called an optical axis, induces a birefringence phenomenon which is expressed by the fact that the refraction index depends on the relative orientation of the polarization of the incident beam and of the optical axis. On the one hand, this induces that the optical properties of the crystal, such as the bandwidths, depend on the relative orientation of the polarization of the incident beam and of the optical axis of the crystal. On the other hand, this induces a difficulty in the making of the photonic crystal because of the sensitivity of the optical properties of the crystal to stacking faults. Any stacking fault which perturbs the optical axis of the crystal causes a degradation in the time and space characteristics of the optical signal.

By using a three-dimensional photonic crystal, it is possible to entirely get rid of any preferential orientation with respect to the polarization of the incident beam in the case of a cubic crystalline arrangement, or even to strongly reduce the influence of the relative orientation of the polarization of the beam and of the optical axis in the case of arrangements other than cubic arrangements. Further, the making of the three-dimensional crystal is facilitated since the optical properties of the crystal are less sensitive to a stacking fault than in the case of a two-dimensional crystal, by the actual fact that a three-dimensional crystal does not have any specific optical axis.

It should be noted that the diffraction grating is distinguished from the three-dimensional photonic crystal notably by the fact that it has periodicity only in the plane of its surface, while the crystal has bulk periodicity.

Moreover, the period of the diffraction grating may be different from, or substantially equal to that of the three-dimensional photonic crystal.

Advantageously, the dielectric material used for the diffraction grating and the three-dimensional crystal is silica. Silica has a high damage threshold which makes its use particularly interesting within the scope of pulse amplification.

The dielectric material used for the diffraction grating and the three-dimensional crystal may also be silicon. By selecting the dielectric material it may be adapted to the sought wavelength range. In the wavelength range of power lasers, selection of a dielectric material with a high damage threshold is particularly advantageous.

Subsequently, as examples, we shall describe a three-dimensional crystal comprising in one case, an arrangement of silica spheres and in another an arrangement of holes in a silicon matrix. Of course, these examples are not limiting and the described materials may be replaced by any other dielectric material.

Figure 3:
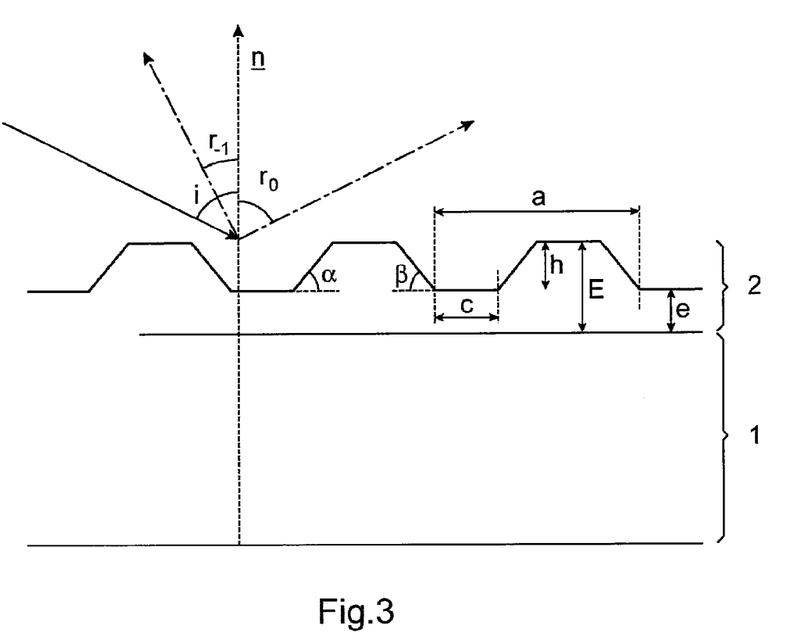
FIG. 3 illustrates a block diagram relating to the optical device according to the invention.

FIG. 3 describes a diagram of the optical device according to the invention. The device comprises two components, i.e. a three-dimensional photonic crystal of silica 1 on the one hand, and a diffraction grating 2 directly arranged on the crystal on the other hand. The three-dimensional photonic crystal 1 advantageously comprises a periodic stack of silica spheres or a silicon matrix including spherical holes of air or gas. The arrangement of spheres or spherical holes is that of a cubic lattice. This arrangement is not limiting and other arrangements may be contemplated such as the hexagonal lattice. The primitive cell of the lattice of the photonic crystal may be a sphere or a spherical hole, or even another pattern capable of being stacked, for example a polyhedron. On the other hand, the device according to the invention comprises a diffraction grating 2 directly arranged on the three-dimensional photonic crystal 1. The diffraction grating is made with a dielectric layer in silica with a thickness E, in which a periodic succession of rulings of period a and of thickness h are engraved. Different patterns are possible, for example sinusoidal, ladder or trapezoidal patterns. The latter pattern is illustrated in FIG. 3. The thickness of the layer of the non-engraved dielectric is noted as e=E−h, the width of the grooves is noted as c and the base of the trapeziums have angles noted as α and β with the horizontal.

An optical beam with wavelength λ and incident angle i relatively to the normal n is sent onto this device. The angles are by definition measured relatively to the normal n. The angle of the diffracted beam in the order 0 is noted as $r_0$ and corresponds to specular reflection $r_0=-i$. The angle of the diffracted beam in the order −1 is noted as $r_{-1}$.

The dimensional parameters of the grating such as for example the depth of the groove, its width, but also the amplitude and the period of the grating, may be optimized so as to guarantee a maximum diffraction rate in the order −1. Thus, it is known that in order to guarantee significant diffraction efficiency, and only obtaining the order 0 and −1 for a given wavelength λ of the incident beam, the pitch of the grating a should verify the following relationship:

$$2 < \frac{\lambda}{a} < \frac{2}{3}$$

Figure 4:
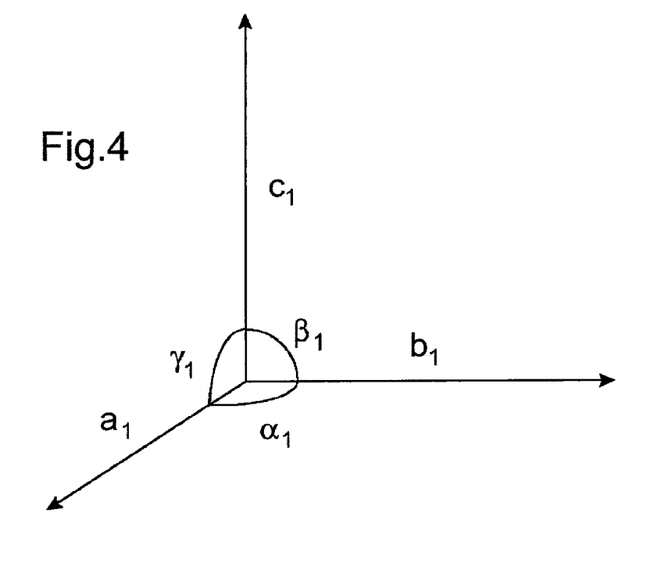
FIG. 4 illustrates a particular embodiment of the invention.

FIG. 4 shows a crystalline arrangement mode of the three-dimensional photonic crystal according to the invention, corresponding to the cubic mode. FIG. 4 more particularly illustrates the primitive cell of a cubic lattice where only the three periodicity vectors $a_1$, $b_1$ and $c_1$ are illustrated. The angle between these three axes are noted as $\alpha_1$, $\beta_1$ et $\gamma_1$. The angle $\alpha_1$ is defined between $a_1$ and $b_1$; the angle $\beta_1$ between $b_1$ and $c_1$ and the angle $\gamma_1$ between $c_1$ and $a_1$. By definition of the cubic lattice, $a_1=b_1=c_1$ and $\alpha_1=\beta_1=\gamma_1=90°$. The nodes of this primitive cell may correspond to a sphere or polyhedron of silica, or to a hole with a spherical or polyhedral shape within a silicon matrix. This arrangement mode according to the invention corresponds to the cubic crystal family and therefore notably comprises the cubic centered lattice and the face-centered cubic lattice.

Figure 5:
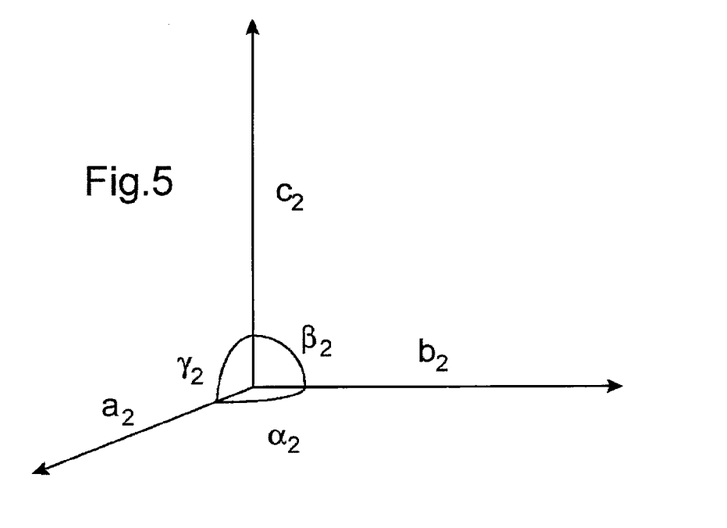
FIG. 5 illustrates a second particular embodiment of the invention.

FIG. 5 shows a crystalline arrangement mode of the three-dimensional photonic crystal according to the invention, corresponding to the hexagonal mode. FIG. 5 more particularly illustrates the primitive cell of a hexagonal lattice where only the three periodicity vectors $a_2$, $b_2$ and $c_2$ are illustrated. The angles between these three axes are noted as $\alpha_2$, $\beta_2$ and $\gamma_2$. The angle $\alpha_2$ is defined between $a_2$ and $b_2$; the angle $\beta_2$ between $b_2$ and $c_2$ and the angle $\gamma_2$ between $c_2$ and $a_2$. By definition of the cubic lattice, $a_2=b_2$, $\alpha_2=120°$ and $\beta_2=\gamma_2=90°$. The nodes of this primitive cell may correspond to a sphere or polyhedron of silica, or to a hole of spherical or polyhedral shape within a silicon matrix. This arrangement mode according to the invention corresponds to the hexagonal crystal family; it therefore comprises any conventional cell belonging to this family.

The making of the optical device according to the invention comprises three steps. First of all, the three-dimensional photonic crystal is made according to the method described in U.S. Pat. No. 6,858,079 published on Feb. 22, 2005. This method differs from the standard crystallization method by sedimentation which cannot prevent the presence of many stacking faults. With this method, it is thereby possible to divide by the number of stacking faults, according to the article of Vlasov et al. entitled <<On-chip natural assembly of silicon photonic bandgap crystals>> and published in Nature on Nov. 14, 2001. A suspension of monodispersive spheres of silica in a solvent is used and a substrate is then immersed in this suspension perpendicularly to the surface of the liquid, so as to form a capillary meniscus. By progressive evaporation of the solvent, the spheres present in the meniscus are subject to a capillary force which forces them to be stacked according to an arrangement which minimizes energy. The obtained crystalline arrangements are face-centered cubic or hexagonal lattices. Both of these crystalline arrangements have compactness among the highest ones and thereby minimize the stacking faults.

The monodispersive silica spheres are obtained by adding tetraethoxysilane in a solution of ethanol, deionized water and aqueous ammonium hydroxide. The diameter of the sphere is controlled by the tetraethoxysilane concentration in the solution.

Moreover, in order to obtain an inverted silicon crystal, i.e. a matrix consisting of a periodic arrangement of holes, one starts with a positive crystal obtained as discussed above. The crystal is then filled with amorphous silicon with a low pressure chemical vapor deposition oven, and then solidified in order to obtain a polysilicon structure. The silica spheres are then dissolved by chemical etching, for example with aqueous hydrofluoric acid. Silica is then totally dissolved and removed, by which a silicon matrix may be obtained, consisting of a periodic three-dimensional arrangement of spherical air holes.

In a second step, a silica layer with a thickness of few hundred nanometers is deposited, for example by means of a sol-gel method or a method with silica evaporation in vacuo. For example a description of the sol-gel method is found in patent FR 2 693 558 published on Jan. 14, 1994. It consists of using a sol consisting of a colloidal silica suspension in a liquid solvent. The sol is deposited on the crystal by using a coating cylinder placed under the surface to be treated and performing a translational movement at constant speed. The sol meniscus formed at the periphery of the cylinder by wetting ensures deposition of the thin layer at the surface of the crystal. Finally, by evaporating the solvent, the sol placed on the surface of the crystal may form the intended thin layer. By controlling the rate, it is possible to control the thickness of the applied thin layer.

The deposition may alternatively be carried out by a method with evaporation of silica in vacuo, in a way known per se.

In a third step, the diffraction grating is engraved in the layer deposited in the second step. The engraving may be carried out according to known methods of holography or of ion etching, or even engraving by a diamond. A deposition method through a mask having the intended periodic patterns may also be used. The grating may be generated with a mask having apertures with the intended period and placed on the thin layer to be etched. Silica is evaporated through apertures of the mask. The mask is then removed by chemical, physical or plasma means, in order to obtain the grating.

A method by liquid chemical etching combined with a holographic method, as described for example in U.S. Pat. No. 5,907,436, may also be used. A layer of etching mask is deposited on the thin layer, and then a layer of photosensitive material such as photoresist. The intended periodic pattern is printed by a holographic method on the photoresist. The photoresist as well as the portions not protected by the photoresist of the etching mask are removed by chemical means or by plasma. Next, by liquid chemical etching, the portions of the layer to be etched which are not protected by the etching mask are etched. Finally, the mask is taken off and the thin layer has the intended periodicity patterns.

The invention is presented here within the scope of a short pulse laser compression dispersive system. It is known to one skilled in the art that it may be used in other applications, notably for spectroscopy or further for demultiplexing frequencies, for example in telecommunications.

The invention claimed is:

1. An optical device for laser pulse compression, comprising:
 a reflective structure of a three-dimensional photonic crystal having bulk periodicity and including a dielectric material and air or gas; and
 a reflection diffraction grating included in a dielectric material directly deposited on the reflective structure, the dielectric material of the diffraction grating being the same as the dielectric material included in the three-dimensional photonic crystal of the reflective structure, the diffraction grating only having periodicity on a plane of a surface thereof.

2. The optical device according to claim 1, wherein the reflective structure is an arrangement of a face-centered cubic lattice or hexagonal lattice type.

3. The optical device according to any of claims 1 to 2, wherein the reflective structure is a periodic three-dimensional arrangement of spheres.

4. The optical device according to any of claims 1 to 2, wherein the reflective structure is a matrix containing a periodic three-dimensional arrangement of spherical holes.

5. The optical device according to any of claims 1 to 2, wherein the diffraction grating and the reflective structure are in silica.

6. The optical device according to any of claims 1 to 2, wherein the diffraction grating and the reflective structure are in silicon.

7. The optical device according to any of claims 1 to 2, wherein a period of the grating is substantially equal to a period of the crystal.

8. The optical device according to claim 4, wherein the grating and the reflective structure are in silicon.

9. The optical device according to claim 1, wherein the reflective structure of the three-dimensional photonic crystal consists of the dielectric material and the air or gas.

* * * * *

UNITED STATES PATENT AND TRADEMARK OFFICE
CERTIFICATE OF CORRECTION

| | |
|---|---|
| PATENT NO. | : 9,013,794 B2 |
| APPLICATION NO. | : 12/678176 |
| DATED | : April 21, 2015 |
| INVENTOR(S) | : Jerome Neauport |

It is certified that error appears in the above-identified patent and that said Letters Patent is hereby corrected as shown below:

In the specification, column 6, line 11, please add -- 20 -- between "divide by" and "the number"

Signed and Sealed this
Sixth Day of October, 2015

Michelle K. Lee
*Director of the United States Patent and Trademark Office*